United States Patent [19]

Schulten et al.

[11] 4,011,305

[45] Mar. 8, 1977

[54] PROCESS FOR OBTAINING HYDROGEN AND OXYGEN FROM WATER

[75] Inventors: Rudolf Schulten, Richterich; Karl Friedrich Knoche, Aachen, both of Germany

[73] Assignee: Rheinische Braunkohlenwerke AG, Cologne, Germany

[22] Filed: Oct. 4, 1974

[21] Appl. No.: 512,797

[52] U.S. Cl. .............................. 423/579; 423/481; 426/658

[51] Int. Cl.$^2$ ........................................ C01B 13/02

[58] Field of Search ........... 423/579, 481, 648, 658

[56] References Cited

UNITED STATES PATENTS

| | | | |
|---|---|---|---|
| 3,443,991 | 5/1969 | Kremm | 423/481 |
| 3,842,164 | 10/1974 | Wentorf, Jr. | 423/579 |

*Primary Examiner*—Earl C. Thomas
*Attorney, Agent, or Firm*—Seidel, Gonda & Goldhammer

[57] ABSTRACT

A process for the dissociation of water into hydrogen and oxygen in a multi-stage closed cycle process using a system involving at least one metallic element having multiple valency and at least one halogen, characterized in that a halide of the multiple valency metallic element is subjected to a mixture of steam and hydrogen converting the halide to a mixture of the metallic element and at least one oxide thereof, said latter mixture is subjected to steam to produce a mixed valency oxide of the metallic element accompanied by the liberation of hydrogen, and said mixed valency oxide is then subjected to a hydrogen halide to convert it back to the said metallic halide with the liberation of oxygen.

5 Claims, No Drawings

PROCESS FOR OBTAINING HYDROGEN AND OXYGEN FROM WATER

BACKGROUND TO THE INVENTION

1. Field of the Invention

This invention relates to processes for the dissociation of water into hydrogen and oxygen by means of heat.

The dissociation of water with the aid of thermal energy from nuclear processes and with the aid of other cheap sources of heat will in the future play a very great role. The use of hydrogen, particularly from the environmental viewpoint, has especially favourable aspects, since the combustion of hydrogen creates no products which are damaging to the environment. Moreover, hydrogen is light and cheap to transport. Also, the use of oxygen, which is automatically produced in the dissociation of water, will be of great utility in the future. In particular, the use of hydrogen and oxygen in energy-related processes, for example in steam and gas turbines, could be extraordinarily advantageous.

BACKGROUND TO THE INVENTION

2. Description of the Prior Art

It is already known that a favourable production of hydrogen and oxygen from water is possible with an iron/chlorine system. In this system, in a circulatory or recycling process, the different chemical valency of iron in comparison with oxygen is utilised. By the use of compounds including chlorine a closed cycle reaction sequence can be created by means of which one is in a position to process hydrogen and oxygen with the aid of iron compounds and steam.

SUMMARY OF THE INVENTION

It has now been found that one can split water with especial advantage with the aid of cyclic processes of for example the iron/chlorine system if one combines two of the possible basic processes and causes them to occur jointly.

In accordance with the invention in its broadest form there is provided a process for the dissociation of water into hydrogen and oxygen in a multi-stage closed cycle process using a system involving at least one metallic element having multiple valency and at least one halogen, characterised in that a halide of the multiple valency metallic element is subjected to a mixture of steam and hydrogen converting the halide to a mixture of the metallic element and at least one oxide thereof, said latter mixture is subjected to steam to produce a mixed valency oxide of the metallic element accompanied by the liberation of hydrogen, and said mixed valency oxide is then subjected to a hydrogen halide to convert it back to the said metallic halide with the liberation of oxygen.

Also in accordance with the invention there is provided a process for the dissociation of water into hydrogen and oxygen in a multi-stage closed cycle process using an iron/chlorine system, characterised in that iron(II)chloride is subjected to a mixture of steam and hydrogen converting the iron(II)chloride to a mixture of iron(II)oxide and iron, said latter mixture is subjected to steam to produce iron(II,III)oxide accompanied by the liberation of hydrogen, and said iron(II,III)oxide is then subjected to hydrogen chloride to convert it back to iron(II)chloride with the liberation of oxygen.

The basic processes, hereinafter indicated as A and B, which are combined in the process of the present invention, but which could also be carried out individually, are as follows (as applied to an iron/chlorine system):

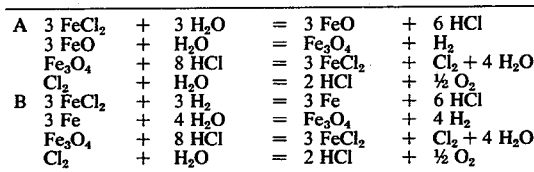

It has now been established surprisingly that these two processes A and B can with advantage be superimposed. This means therefore that one permits both hydrogen and steam to act simultaneously on ferrous chloride, i.e. iron(II)chloride. In this reaction numerous intermediate products can be produced, for example $Fe_2O_3$ and $Fe_3O_4$. However, with the aid of the ferrous chloride which is provided, these intermediate products are converted, in fact according to the equations $Fe_2O_3 + FeCl_2 + H_2 = 3FeO + 2 HCl$ and $Fe_3O_4 + 3FeCl_2 = 4 FeO + 2 FeCl_3$. Ferric chloride $FeCl_3$ also occurs as a further intermediate product, and for its part this is converted according to the equations $2FeCl_3 + 2H_2O = Cl_2 + 2FeO + 4HCl$ or $2FeCl_3 + H_2 = 2FeCl_2 + 2HCl$.

By treatment of the bivalent ferrous chloride $FeCl_2$ with steam and hydrogen in the temperature range between about 300° C and 1000° C there is thus produced a mixture of iron and the bivalent iron oxide and a gaseous mixture of hydrogen chloride HCl, chlorine $Cl_2$ and steam $H_2O$. The mixture of iron and iron oxide is treated with steam, with the result that the desired hydrogen is obtained. The product gas mixture obtained by this process and comprising hydrogen chloride, chlorine and steam is passed for example at a temperature of between about 300° and 600° C to the mixed valency iron oxide $Fe_3O_4$, with the result that oxygen is obtained. In this process intermediate products occur, but these are all converted to ferrous chloride $FeCl_2$.

DESCRIPTION OF THE PREFERRED EMBODIMENT

The process of the invention can be carried out for example with material beds, and the reactants ferrous chloride and the iron oxide can be carried on porous packing material in the beds. The process can be carried out for example as follows.

In the reaction two alternatively activated material beds are used. In the one bed there is the ferrous chloride $FeCl_2$, while in the other bed there is the mixed valency ferrous-ferric oxide $Fe_3O_4$. The bed with the ferrous chloride is subjected to steam and hydrogen approximately in a temperature range of 700° to 1000° C and for example at a pressure of 40 to 100 atmospheres. In this way the ferrous chloride is converted, and there is created a product gas mixture at a temperature of between about 300° and 500° C consisting of hydrogen chloride, chlorine, steam and a very small amount of oxygen. This product gas mixture is fed into the material bed which contains the ferrous-ferric oxide. By the inter-reaction of the gaseous mixture with the mixed valency iron oxide, oxygen and steam are produced. The product gas is then obtained at a temperature of between 200° and 400° C. The ferrous chloride in the first bed is in the main converted to iron oxide and to iron, and the ferrous-ferric oxide in the second bed into ferrous chloride. After the termination of this first process step there then follows the second process step. In the second step the mixture of iron oxide and iron in the first bed is subjected to steam at a temperature for example in the range of 400° to 800° C, with the result that it is converted into ferrous-ferric oxide $Fe_3O_4$ accompanied by the liberation of hydrogen.

As a result of these two steps the materials in the two beds have essentially changed places and one can then carry out a third step which is substantially the mirror image of the first process step. In it the ferrous chloride, now in the second bed, is again subjected to steam, for example at between 700° and 1000° C, and which is mixed with hydrogen. From this reaction, as in the first step, there is produced a product gas mixture of hydrogen chloride, chlorine and steam which at a temperature of about 300° to 500° C is fed to the first bed now containing the ferrous-ferric oxide. As the product gas of this reaction one obtains a mixture of steam and oxygen. Concurrently, the ferrous chloride is converted into a mixture of iron oxide and iron, and the ferrous-ferric oxide is converted into ferrous chloride. After this step the reaction can be repeated continuously by further cyclic stages.

It may be advantageous to mix magnesium oxide with the reactants $Fe_3O_4$ and $FeCl_2$, in order that the magnesium oxide can act as an absorbing agent for any superfluous hydrogen chloride and chlorine. In this case, the reaction is carried out at lower temperatures. During the treatment with steam, in which the desired hydrogen is produced, the dissociation of the chlorine bound up with the magnesium takes place with the creation of hydrogen chloride. This hydrogen chloride, now at a relatively high temperature, is passed to the second bed which contains the mixed ferrous-ferric oxide $Fe_3O_4$. The magnesium oxide can alternatively be used in the form of a separate material bed, which has the advantage that hydrogen chloride and chlorine can more readily be separated from the hydrogen. The combination of hydrogen chloride and chlorine with the magnesium oxide can be made reversible at high temperatures with the aid of steam, with the result that hydrogen chloride and chlorine are again obtained from the reaction. Instead of magnesium oxide one could alternatively use some other alkaline earth oxide.

The reaction described above is not in principle limited only to the use of iron and chlorine. Iron could be replaced by some other metal of the periodic system which has a corresponding multiple valency, for example chromium, manganese, vanadium, copper, cobalt or nickel. The element chlorine could for example be replaced by bromine. Possibly, it could be advantageous to use a mixture of elements for the process, since the individual chemical elements differ in their thermodynamic properties and by the use of a mixture one could appropriately match the thermodynamic parameters to the cyclic process. One could thereby achieve the object of better utilisation of the heat produced in the process over the whole temperature range.

We claim:

1. A process for the dissociation of water into hydrogen and oxygen in a multi-stage closed cycle process using an iron/chlorine system, characterized in that a first material bed containing iron(II)chloride is subjected to a mixture of steam and hydrogen converting the iron(II)chloride to a mixture of iron(II)oxide and iron, said latter mixture is subjected in said first bed to steam to produce iron(II,III)oxide accompanied by the liberation of hydrogen, and said iron(II,III)oxide is then subjected in said first bed to hydrogen chloride to convert it back to iron(II)chloride with the liberation of oxygen.

2. A process as claimed in claim 1, in which the iron(II)chloride is subjected in said first bed to the steam-hydrogen mixture at 40 to 100 atmospheres pressure and at a temperature in the range 300° to 1000° C whereby there is produced in addition to the iron and iron(II)oxide mixture a product gas comprising hydrogen chloride and chlorine which is fed into a second material bed containing iron(II,III)oxide, whereby the iron(II,III)oxide is converted into iron(II)chloride with the production of oxygen, and in a further process step the mixture of iron and iron(II)oxide which has been obtained in said first bed is converted into iron(II,III)oxide with the liberation of hydrogen by treatment with steam at a temperature in the range of 300° to 600° C, with these steps thereafter being repeated in mirror image fashion by reversal of the two beds.

3. A process as claimed in claim 2, in which the iron(II)chloride and the iron(II,III)oxide and other reactants are carried on porous packing material which forms the charge of said two respective material beds.

4. A process as claimed in claim 1, in which an alkaline earth oxide is also provided in association with each of the reactants iron(II)chloride and iron(II,III)oxide.

5. A process as claimed in claim 2, in which at least one further material bed containing alkaline earth oxides is used in order to extract superfluous chlorine and hydrogen chloride, said at least one further bed thereafter being subjected to superheated steam to extract chlorine and hydrogen chloride.

* * * * *